(12) United States Patent
Spinnler (10) Patent No.: US 12,522,023 B2
(45) Date of Patent: Jan. 13, 2026

(54) TIRE TREAD FOR A HEAVY VEHICLE WITH IMPROVED ROBUSTNESS

(71) Applicant: COMPAGNIE GENERALE DES ETABLISSEMENTS MICHELIN, Clermont-Ferrand (FR)

(72) Inventor: Olivier Spinnler, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 170 days.

(21) Appl. No.: 18/267,847

(22) PCT Filed: Dec. 3, 2021

(86) PCT No.: PCT/FR2021/052197
§ 371 (c)(1),
(2) Date: Jun. 16, 2023

(87) PCT Pub. No.: WO2022/129729
PCT Pub. Date: Jun. 23, 2022

(65) Prior Publication Data
US 2024/0034096 A1 Feb. 1, 2024

(30) Foreign Application Priority Data
Dec. 17, 2020 (FR) ..................................... 2013443

(51) Int. Cl.
*B60C 11/12* (2006.01)
*B60C 11/03* (2006.01)
(52) U.S. Cl.
CPC ...... *B60C 11/0306* (2013.01); *B60C 11/1236* (2013.01); *B60C 2011/0341* (2013.01);
(Continued)

(58) Field of Classification Search
CPC ....... B60C 2011/013; B60C 2011/0381; B60C 11/0311; B60C 11/1236
See application file for complete search history.

(56) References Cited

U.S. PATENT DOCUMENTS

D578,059 S  10/2008 Fujita
D795,173 S * 8/2017 Hayashi ...................... D12/588
(Continued)

FOREIGN PATENT DOCUMENTS

CN    204712799    10/2015
CN    105564160    5/2016
(Continued)

*Primary Examiner* — Robert C Dye
(74) *Attorney, Agent, or Firm* — COZEN O'CONNOR (57) ABSTRACT

A tire tread (1), for a heavy-duty construction plant vehicle, having an improved compromise between resistance to mechanical attack caused by stony ground and grip on muddy ground. The tread (1) has five rows (41, 42, 43) separated in pairs by a longitudinal cut (51, 52) and are distributed, along the transverse direction (YY'), in a median row (43), two intermediate rows (42), and two lateral rows (41), the blocks (31, 32, 33) in one and the same row (41, 42, 43) separated in pairs at least partially by a transverse cut (61, 62, 63), each transverse cut in a lateral row (41) is a transverse groove, each transverse cut (62) in an intermediate row (42) is either a blind transverse groove (621), or a transverse sipe (622), are arranged in alternation along the longitudinal direction XX', and each inner longitudinal cut (52) separating two adjacent rows (42, 43), respectively intermediate and median, is a longitudinal groove.

14 Claims, 3 Drawing Sheets

(52) U.S. Cl.
CPC ............... *B60C 2011/0358* (2013.01); *B60C 2011/0381* (2013.01); *B60C 2200/06* (2013.01)

(56) References Cited

U.S. PATENT DOCUMENTS

| | | |
|---|---|---|
| D807,813 S | 1/2018 | Hayashi |
| 2009/0255614 A1 | 10/2009 | Ebiko |
| 2010/0206446 A1 | 8/2010 | Oizumi |
| 2014/0290815 A1 | 10/2014 | Tomida |
| 2018/0297416 A1* | 10/2018 | Ninomiya ........... B60C 11/1204 |
| 2018/0312010 A1* | 11/2018 | Furusawa ............. B60C 11/032 |
| 2019/0225030 A1 | 7/2019 | Pirelli |
| 2022/0144018 A1* | 5/2022 | Grauel ................ B60C 11/1353 |

FOREIGN PATENT DOCUMENTS

| | | | |
|---|---|---|---|
| CN | 107107665 | 8/2017 | |
| CN | 107554197 | 1/2018 | |
| CN | 108725100 | 11/2018 | |
| EP | 3015286 A1 * | 5/2016 | ......... B60C 11/0304 |
| JP | 2013151289 | 8/2013 | |
| WO | WO 2014/170283 | 10/2014 | |
| WO | WO 2018/015832 | 1/2018 | |

\* cited by examiner

TIRE TREAD FOR A HEAVY VEHICLE WITH IMPROVED ROBUSTNESS

RELATED APPLICATIONS

This is a U.S. National Phase Application under 35 USC 371 of International Application PCT/FR2021/052197 filed on Dec. 3, 2021.

This application claims the priority of French application no. FR 2013443 filed Dec. 17, 2020, the entire content of all of which is hereby incorporated by reference.

FIELD OF THE INVENTION

The present invention relates to a tire tread for a heavy-duty vehicle intended to carry heavy loads and to run on uneven, stony and/or muddy ground such as, for example, a construction plant vehicle of the dumper type intended for use in mines or quarries.

BACKGROUND OF THE INVENTION

A tread comprises at least one rubber-based material and is intended to constitute the peripheral part of a tire and to be worn away when its tread surface comes into contact with the ground.

A tread can be defined in geometric terms by three dimensions: a smaller dimension or thickness, along a direction perpendicular to the tread surface; an intermediate dimension or width, along a transverse direction; and a larger dimension or length, along a longitudinal direction. When the tread is incorporated in the tire, the transverse direction is also referred to as axial direction, since it is parallel to the axis of rotation of the tire, and the longitudinal direction is also referred to as circumferential direction, since it is tangential to the circumference of the tire in the direction of running of the tire.

To ensure a satisfactory performance in terms of longitudinal grip, under engine torque and braking torque, and transverse grip, it is necessary to form, in the tread, a combination of cuts separating raised elements, referred to as tread pattern.

The cuts can be of two types: grooves and sipes. Grooves are wide cuts that are essentially for storing and discharging water or mud that is present on the ground. A cut is referred to as wide when it has a width such that the facing walls of material delimiting it do not come into contact with one another when the tread enters the contact patch, the tire being subjected to recommended inflation and load conditions as are defined notably, for example, by the standard ISO 4250 and the standard of the "Tire and Rim Association" or TRA. Sipes are narrow cuts of which the intersections with the tread surface, or edge corners, contribute to grip on wet ground by virtue of an edge-corner effect in the contact patch which makes it possible to break the film of water present on the ground. A cut is referred to as narrow when it has a width such that the facing walls of material that delimit it come into contact with one another at least partially when the tread enters the contact patch, under the tire load and pressure conditions specified by the TRA as seen above.

A cut is often characterized by a mean surface that is equidistant from the walls delimiting the cut and intersecting the tread surface. The intersection of this mean surface and the tread surface is referred to as mean line of the cut. The mean line of a cut is not necessarily rectilinear and may, by way of examples, have a wavy shape or a zigzag shape. A cut is referred to as longitudinal in a broad sense when, at any point, its mean line has a tangent forming an angle with the longitudinal direction of the tread of between 0° and 45°. A cut is referred to as transverse in a broad sense when, at any point, its mean line has a tangent forming an angle with the transverse direction of the tread of between 0° and 45°.

In the case of a tire tread for a heavy-duty construction plant vehicle, the raised elements are generally blocks. A block is a volume of material delimited by a contact face, which is contained in the tread surface, by a bottom surface, and by lateral faces connecting the contact face to the bottom surface. These blocks may be arranged so as to form longitudinal rows of blocks, these rows being separated in pairs by longitudinal cuts of the groove or sipe type, also referred to as longitudinal voids. Furthermore, within one and the same longitudinal row of blocks, the blocks are most often separated in pairs by transverse cuts of the groove or sipe type.

The tread, incorporated in the tire, is most often characterized in geometric terms by a width L, along the transverse direction, and a thickness H, along a direction perpendicular to the tread surface. The width L is defined as the transverse width of that surface of the tread of the new tire that makes contact with smooth ground, such as tarmacked ground, when the tire is subjected to nominal pressure and load conditions recommended, for example, by the TRA standard. The thickness H is conventionally defined as the maximum radial depth measured in the cuts, corresponding to the maximum radial height of a block, when the tire is new. In the case of a tire for a construction plant vehicle of the dumper type, and by way of example, the width L is at least equal to 600 mm and the thickness H is at least equal to 60 mm, or even 70 mm.

The conventional running conditions of a tire for a construction plant vehicle are particularly harsh. By way of example, such a vehicle is intended to run on tracks that are most often sloping, either uphill, which requires good grip of the tires under traction, or downhill, which requires good grip of the tires under braking. In addition, these tracks are also often winding, this requiring good transverse grip of the tires. Lastly, the tracks on which the vehicles run are generally made up of materials extracted in situ, for example compacted crushed rocks which are regularly damped down in order to ensure the integrity of the wearing layer of the track as the vehicles pass along it and are often covered with mud and water: this requires both good resistance of the tread to attack, so as to ensure a satisfactory service life, and a good capacity both for this mixture of mud and water to penetrate and be discharged from the tread, so as to ensure satisfactory grip on muddy ground. These harsh running conditions furthermore cause considerable mechanical compressive and shear stresses in the blocks of the tread. The deformations of the blocks will then generate heat dissipation in the constituent viscoelastic material of the tread. This heat dissipation will generate a rise in temperature in the crown of the tire that can cause severe damage, or even rupture, of the crown reinforcement of the tire, radially on the inside of the tread.

A tread comprising blocks and aiming to ensure good longitudinal grip under traction and under braking, satisfactory transverse grip, mud discharge capacity and a limited level of heat has already been described, for example in the document WO 2014170283.

SUMMARY OF THE INVENTION

The inventors have set themselves the aim, for a tread of a tire for a heavy-duty vehicle, in particular a heavy-duty construction plant vehicle, that comprises blocks, of further improving the compromise between grip of the tread, in particular traction on muddy ground, and the heat level in the crown of the tire.

This aim has been achieved by a tread of a tire for a heavy-duty vehicle that is intended to come into contact with the ground via a tread surface, comprising blocks which are arranged in rows along a longitudinal direction and are delimited by cuts, the tread having a width, measured along a transverse direction between two lateral edges of the tread surface, and a height, which is equal to the maximum depth of a cut measured along a direction perpendicular to the tread surface, it being possible for the cuts to be at least partially either a groove having a depth at least equal to 50% of the height of the tread and a width at least equal to 20% of the said depth, or a sipe having a depth at least equal to 50% of the height of the tread and a width strictly less than 20% of the said depth, the tread comprising five rows which are separated in pairs by a longitudinal cut and are distributed, along the transverse direction, in a median row, centred on a median plane perpendicular to the tread surface at its middle, two intermediate rows, which are on either side of the median row and are symmetrical in relation to the median plane, and two lateral rows, which are transversely outermost and symmetrical in relation to the median plane, the blocks in one and the same row being separated in pairs at least partially by a transverse cut, each transverse cut in a lateral row being a transverse groove extending from a lateral edge of the tread surface to an outer longitudinal cut, each transverse cut in an intermediate row being either a blind transverse groove, which continues a transverse groove in the neighbouring lateral row and extends from an outer longitudinal cut to a transversely inner end of a blind transverse groove, or a transverse sipe extending from an outer longitudinal cut to an inner longitudinal cut, so that every blind transverse groove alternates with a transverse sipe, along the longitudinal direction, and each inner longitudinal cut separating two adjacent rows, respectively intermediate and median, is a longitudinal groove.

The tread to which the invention relates therefore comprises five rows of blocks distributed in a median row of blocks, which is centred on the median plane of the tread, two lateral rows, which are symmetrical in relation to the median plane and are transversely on the outside, that is to say positioned at the tread edge, and two rows of intermediate blocks, each intermediate row being transversely positioned between the median row and a lateral row.

The presence of transverse grooves, each having a depth at least equal to 50% of the height of the tread and a width at least equal to 20% of the said depth, in each lateral row of blocks, the transverse grooves continuing in a transversely outer part of the intermediate row of blocks that is closest by way of a blind transverse groove, that is to say not passing all the way through the intermediate row, ensures the creation of continuous channels between this transversely outer part of the intermediate row and the lateral row, thus enabling lateral discharge of water or mud that is present on the ground and thereby promoting the grip of the tire. These channels also contribute to cooling that part of the tire crown that is radially on the inside of these channels, and therefore to the endurance of the crown of the tire.

The presence of transverse sipes, each having a depth at least equal to 50% of the height of the tread and a width at most equal to 20% of the said depth, in each intermediate row alternating with blind transverse grooves, ensures the closure of the intermediate row, making it possible to protect the crown of the tire in this intermediate region against attack caused by stones present on the ground. It is specifically a region which exhibits strong pressures in the contact patch and is sensitive to attack caused by stones.

Also according to the invention, the inner longitudinal cut separating two adjacent rows, respectively intermediate and median, is a longitudinal groove. This inner longitudinal groove is a continuous channel between an intermediate row and the median row, thus enabling longitudinal discharge of water or mud that is present on the ground, thereby promoting the grip of the tire. This channel also contributes to the cooling of the tire crown part that is radially on the inside thereof, and therefore to the endurance of the crown of the tire.

Consequently, the tread enables effective discharge of water or mud that is present on the ground, at any point on the tread surface, either laterally through the transverse channels made up of the transverse grooves in a lateral row continued by blind transverse grooves in an intermediate row, or longitudinally through the longitudinal channels made up of the inner longitudinal grooves positioned between an intermediate row and a median row.

This network of transverse and longitudinal channels also contributes to effective ventilation of the tread and to the cooling of the crown of the tire.

Advantageously, each outer longitudinal cut has a mean line positioned, in relation to the median plane of the tread and along the transverse direction, at a mean distance at least equal to 20% of the width of the tread. The mean line of the cut is the plot, on the tread surface, of the mean surface of the cut that is equidistant from the walls of blocks delimiting it. Since the mean line of the cut is not necessarily strictly longitudinal, its mean distance in relation to the median plane is the mean of the distances of all of its points from the median plane. The above feature defines the minimum mean distance of each outer longitudinal cut from the median plane, and therefore correspondingly the maximum width of a lateral row. The resulting technical effect is to ensure an acceptable level of heat in the tire crown lateral portion that is radially on the inside of a tread edge and generally subjected to high temperatures.

Also advantageously, each outer longitudinal cut has a mean line positioned, in relation to the median plane of the tread and along the transverse direction, at a mean distance at most equal to 35% of the width of the tread. This feature defines the maximum mean distance of each outer longitudinal cut from the median plane, and therefore correspondingly the minimum width of a lateral row. The resulting technical effect is to ensure a level of stiffness of each lateral row that is acceptable as regards the wear of the tread when the tire is subjected to transverse cornering stresses.

Advantageously, each transversely inner end of a blind transverse groove in an intermediate row is positioned, in relation to the median plane of the tread and along the transverse direction, at a distance at least equal to 20% of the width of the tread. This feature implicitly defines a maximum engagement of the blind transverse groove in the intermediate row. If the blind transverse groove portion is excessively engaged, that is to say if its transversely inner end is too close to the median plane, it then extends into the region which exhibits strong pressures in the contact patch and is particularly sensitive to attacks caused by stones. This then makes the intermediate row more sensitive to attacks caused by stones.

Also advantageously, each transversely inner end of a blind transverse groove in an intermediate row is positioned, in relation to the median plane of the tread and along the transverse direction, at a distance at most equal to 35% of the width of the tread. This feature implicitly defines a minimum engagement of the blind transverse groove in the intermediate row. If the blind transverse groove is engaged to a sufficient extent, that is to say if its transversely inner end is close enough to the median plane, it then extends into the contact patch when the tire is subjected to a small load, typically under a load equal to 20% of its nominal load, when it is mounted in a twinned configuration on the rear axle of an unladen vehicle. In these conditions, the presence of a blind transverse groove in the contact patch ensures lateral discharge of water or mud that is present on the ground, thereby promoting the grip of the tire.

Advantageously, each inner longitudinal cut has a mean line positioned, in relation to the median plane of the tread and along the transverse direction, at a mean distance at least equal to 5% of the width of the tread. The mean line of the cut is the plot, on the tread surface, of the mean surface of the cut that is equidistant from the walls of blocks delimiting it. Since the mean line of the cut is not necessarily strictly longitudinal, its mean distance in relation to the median plane is the mean of the distances of all of its points from the median plane. This feature defines the minimum mean distance of each inner longitudinal cut from the median plane, and therefore correspondingly the minimum width of a median row. A median row which is not wide enough would then be made up of blocks that are narrow, and therefore less stiff and more sensitive to chunking.

Also advantageously, each inner longitudinal cut has a mean line positioned, in relation to the median plane of the tread and along the transverse direction, at a mean distance at most equal to 20% of the width of the tread. This feature defines the maximum mean distance of each inner longitudinal cut from the median plane, and therefore correspondingly the maximum width of a median row. A median row which is too wide would then be made up of blocks that are wide and therefore unfavourable to the thermal behaviour of the crown of the tire.

Preferably, each outer longitudinal cut separating two adjacent rows, respectively lateral and intermediate, is a longitudinal sipe. These longitudinal sipes ensure closure, and therefore protection of the tread with regard to attacks caused by stones present on the ground. In addition, these longitudinal sipes limit the transverse movements of the rows of blocks via a shoulder effect between the rows when the tire is subjected to transverse stresses, such as when cornering. This transverse stiffening of the tread consequently limits the wear of the rows of blocks under cornering.

Also preferably, each transverse cut in the median row is a transverse sipe which continues a transverse sipe in the neighbouring intermediate row and extends from a first inner longitudinal cut to a second inner longitudinal cut. The presence of transverse sipes, each having a depth at least equal to 50% of the height of the tread and a width at most equal to 20% of the said depth, in the median row, ensures the closure of the median row, making it possible to protect the crown of the tire in this median region against attack caused by stones present on the ground. It is specifically a region which exhibits strong pressures in the contact patch and is sensitive to attack caused by stones.

Advantageously, with each block in a lateral row, delimited by two consecutive transverse grooves, having a block height along a direction perpendicular to the tread surface and a block length along the longitudinal direction, the block height is at most equal to 80% of the block length. Above 80%, the lateral row block becomes insufficiently stiff and therefore more sensitive to wear, in particular under cornering stresses.

Advantageously, with each block in a lateral row having a block length along the longitudinal direction, and each transverse groove, delimited by two blocks, having a transverse groove width along the longitudinal direction, the transverse groove width is at least equal to 18% of the sum of the transverse groove width and the block length. This feature defines a minimum void ratio of a lateral row of blocks, below which the discharge of water or mud via the lateral part of the tread becomes insufficient, this adversely affecting the grip of the tire.

Also advantageously, with each block in a lateral row having a block length along the longitudinal direction, and each transverse groove, delimited by two blocks, having a transverse groove width along the longitudinal direction, the transverse groove width is at most equal to 35% of the sum of the transverse groove width and the block length. This feature defines a maximum void ratio of a lateral row of blocks, above which the stiffness of the blocks in the lateral row becomes insufficient to ensure good resistance of the tire to wear.

Advantageously, at least one ventilation cavity, opening into the tread surface and having a depth at least equal to 70% of the height, is positioned, along the longitudinal direction, between at least two consecutive transverse grooves in one and the same lateral row. A ventilation cavity is a recess that is formed in the tread, along a substantially radial direction, and has a surface that opens onto the tread surface with a closed contour: it is therefore not a cut as seen above. Such a ventilation cavity is sometimes referred to as ventilation well. The presence of ventilation cavities in the lateral row blocks enables ventilation of the edge of the tread and therefore cooling of that radially inner crown portion that is a hot point of the tire, thereby limiting the degradation of the crown of the tire and improving its endurance.

According to a particular embodiment, the ventilation cavity comprises a radially outer first portion of which the inner wall is inclined at a first angle in relation to a direction perpendicular to the tread surface and which is continued radially towards the inside by a radially inner second portion of which the inner wall is inclined at a second angle, which is strictly less than the first angle, in relation to a direction perpendicular to the tread surface. An inner ventilation wall with a double slope limits the collection and retention of stones in the cavity, these stones being liable to generate cracks that are detrimental to the endurance of the crown of the tire.

Also advantageously, with the tread comprising two outer lateral faces, each intersecting the tread surface at a lateral edge of the tread surface, all transverse grooves in a lateral row opening into a lateral face of the tread along an open section, at least one ventilation cavity, opening into a lateral face of the tread but not into the tread surface when the tire is new, is positioned, along the longitudinal direction, between at least two surfaces into which consecutive transverse grooves in one and the same lateral row open. In the present case, a ventilation cavity is a recess that is formed in a lateral face of the tread, along a substantially transverse direction, and has a surface that opens out on the said tread face with a closed contour. The presence of ventilation cavities that open into a lateral face of the tread enables ventilation of the lateral face of the tread and therefore cooling of the ends of the crown reinforcement layers extending transversely on the inside of the said lateral face of the tread, thereby limiting the degradation of the crown of the tire and improving its endurance. Such a ventilation cavity does not open into the tread surface when the tire is new, in order to avoid initiating manifestations of irregular wear at the tread edge.

The invention also relates to a tire for a heavy-duty vehicle, preferably a heavy-duty construction plant vehicle, comprising a tread according to any one of the embodiments described above.

BRIEF DESCRIPTION OF THE DRAWINGS

The features of the invention, for the tire size 59/80 R 63, are illustrated by FIGS. 1 to 6, which are not drawn to scale.

DETAILED DESCRIPTION OF THE DRAWINGS

In FIGS. 1 to 6, the various geometric dimensions are defined in a frame of reference XYZ defined by a longitudinal or circumferential direction XX', which is tangential to the circumference of the tire along its running direction, a transverse or axial direction YY', which is parallel to the axis of rotation of the tire, and a radial direction ZZ', which is perpendicular to the axis of rotation of the tire. When the surface of the tread of the tire is a cylinder having a substantially rectilinear generatrix and the axis of rotation of the tire as axis of revolution, the radial direction ZZ' is substantially perpendicular to the tread surface at any point on the tread surface.

Figure 1:
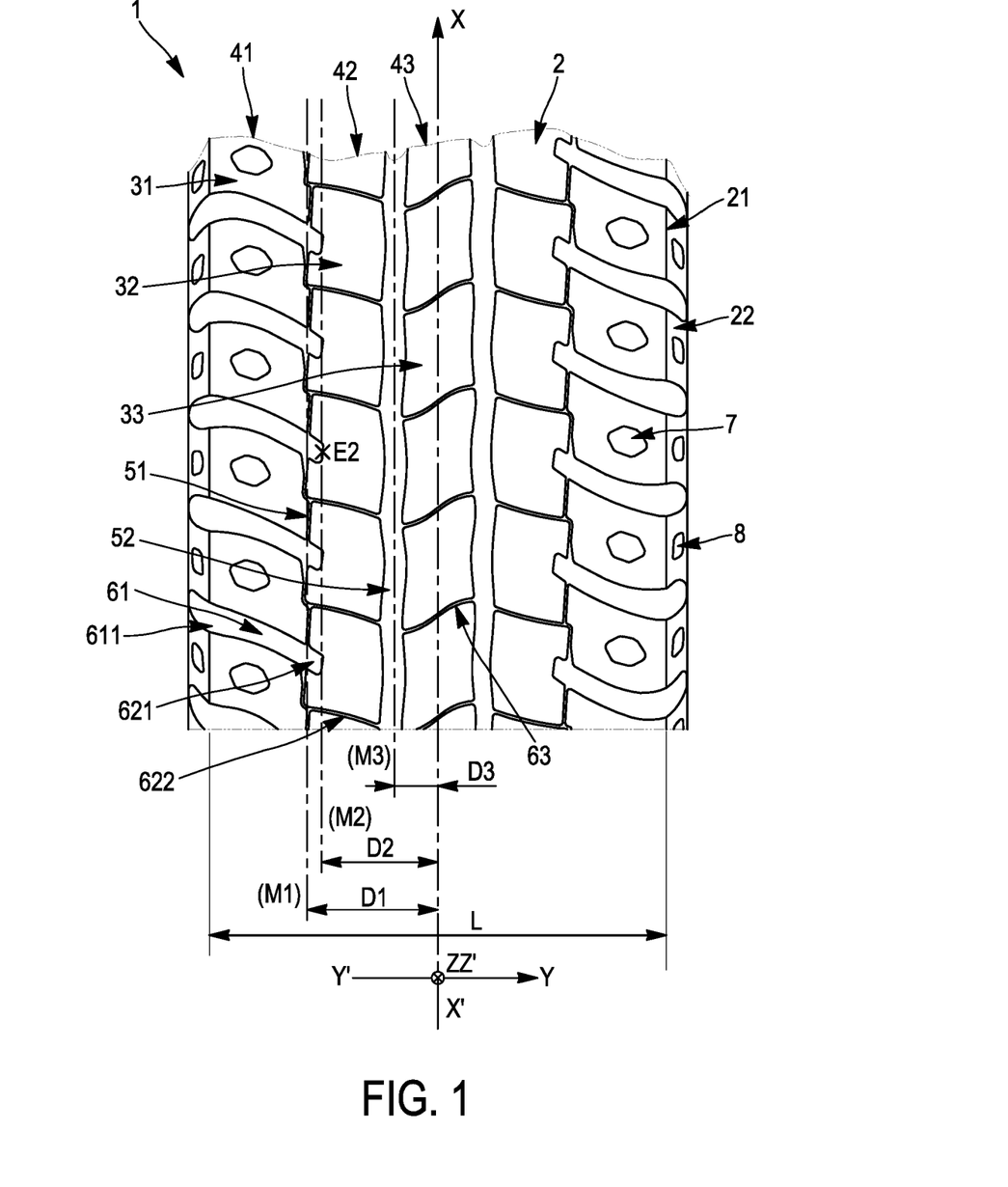
FIG. 1: Top view of a portion of a tread according to the invention.

FIG. 1 is a top view of a portion of a tread 1 according to the invention. The tread 1 of a tire for a heavy-duty vehicle that is intended to come into contact with the ground via a tread surface 2, comprises blocks (31, 32, 33) which are arranged in rows (41, 42, 43) along a longitudinal direction XX' and are delimited by cuts (51, 52, 61, 62, 63). The tread 1 has a width L, measured along a transverse direction YY' between two lateral edges 21 of the tread surface 2. The cuts (51, 52, 61, 62, 63) are at least partially either a wide cut, or groove, or a narrow cut, or sipe. The tread 1 comprises five rows (41, 42, 43) which are separated in pairs by a longitudinal cut (51, 52) and are distributed, along the transverse direction YY', in a median row 43, centred on a median plane XZ perpendicular to the tread surface 2 at its middle, two intermediate rows 42, which are on either side of the median row 43 and are symmetrical in relation to the median plane XZ, and two lateral rows 41, which are transversely outermost and symmetrical in relation to the median plane XZ. The blocks (31, 32, 33) in one and the same row (41, 42, 43) are separated in pairs at least partially by a transverse cut (61, 62, 63). According to the invention, each transverse cut 61 in a lateral row 41 is a transverse groove extending from a lateral edge 21 of the tread surface 2 to an outer longitudinal cut 51. Also according to the invention, each transverse cut 62 in an intermediate row 42 is either a blind transverse groove 621, which continues a transverse groove 61 in the neighbouring lateral row 41 and extends from an outer longitudinal cut 51 to a transversely inner end E2 of the blind transverse groove 621, or a transverse sipe 622 extending from an outer longitudinal cut 51 to an inner longitudinal cut 52, so that every blind transverse groove 621 alternates with a transverse sipe 622. A blind transverse groove 621 therefore does not pass all the way through the intermediate row 42, unlike a transverse sipe 622. Also according to the invention, each inner longitudinal cut 52 separating two adjacent rows (42, 43), respectively intermediate and median, is a longitudinal groove. Each outer longitudinal cut 51 has a mean line M1 positioned, in relation to the median plane XZ of the tread 1 and along the transverse direction YY', at a mean distance D1 at least equal to 20% and at most equal to 35% of the width L of the tread 1. Each transversely inner end E2 of a blind transverse groove 621 in an intermediate row 42 is positioned, in relation to the median plane XZ of the tread 1 and along the transverse direction YY', at a distance D2 at least equal to 20% and at most equal to 35% of the width L of the tread 1. The line M2 passes through all the inner ends E2. Each inner longitudinal cut 52 has a mean line M3 positioned, in relation to the median plane XZ of the tread 1 and along the transverse direction YY', at a mean distance D3 at least equal to 5% and at most equal to 20% of the width L of the tread 1. Each outer longitudinal cut 51 separating two adjacent rows (41, 42), respectively lateral and intermediate, is a longitudinal sipe. Each transverse cut 63 in the median row 43 is a transverse sipe which continues a transverse sipe 622 in the neighbouring intermediate row 42 and extends from a first inner longitudinal cut 52 to a second inner longitudinal cut 52. Ventilation cavities 7, which open into the tread surface 2, are positioned along the longitudinal direction XX' between two consecutive transverse grooves 61 in one and the same lateral row 41. Ventilation cavities 8, which open into a lateral face 22 of the tread but not into the tread surface 2 when the tire is new, are positioned along the longitudinal direction XX' between two surfaces 611 into which consecutive transverse grooves 61 in one and the same lateral row 41 open.

Figure 2:
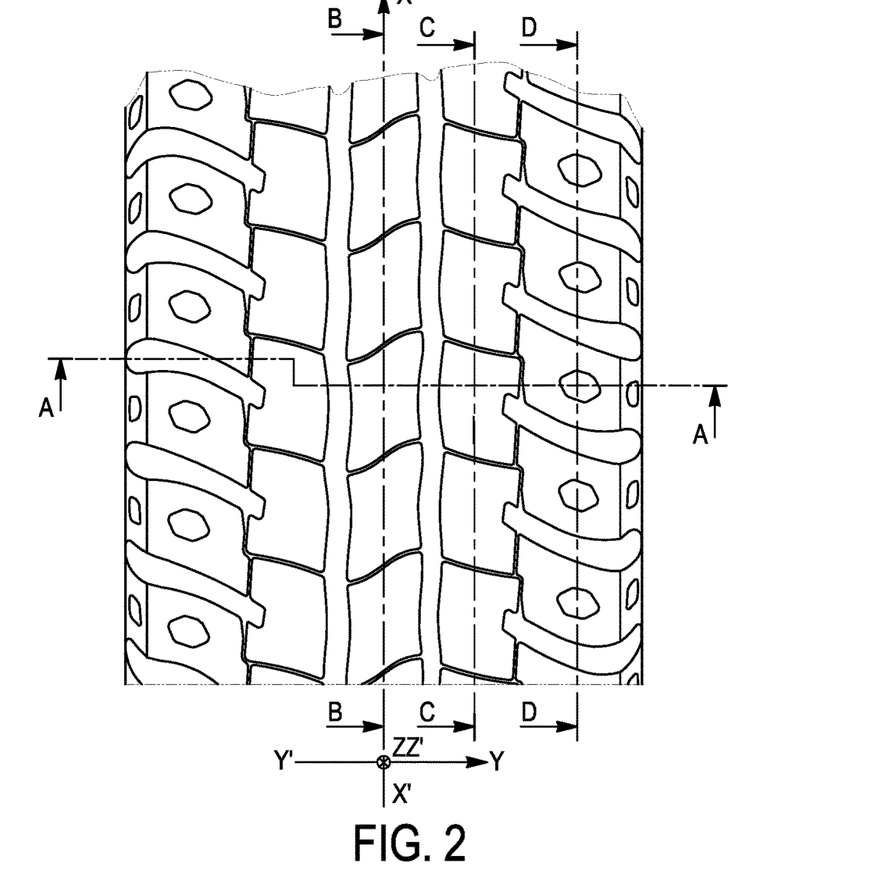
FIG. 2: Top view of a portion of a tread according to the invention, indicating the section planes of FIGS. 3 to 6, FIG. 3: Meridian section of the tread according to the invention, along a broken section line A-A.

FIG. 2 is a top view of a portion of a tread 1 according to the invention, indicating the section planes of FIGS. 3 to 6. The radial section plane, along the broken line A-A, defines a meridian section through the tread, in two radial section regions YZ respectively distributed between the lateral, intermediate and median rows. The circumferential section plane B-B defines a circumferential section through the median row. The circumferential section plane C-C defines a circumferential section through an intermediate row. The circumferential section plane D-D defines a circumferential section through a lateral row.

Figure 3:
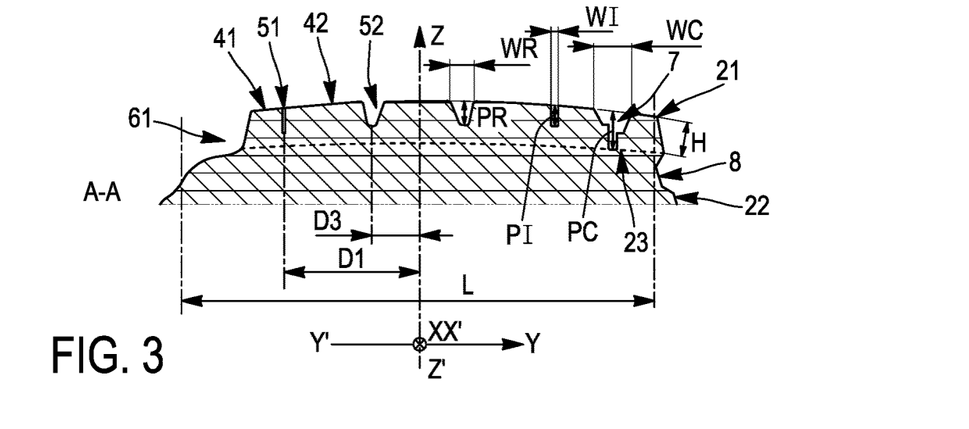

FIG. 3 is a meridian section through the tread according to the invention, along a broken section line A-A. The tread, which is intended to come into contact with the ground via a tread surface 2, comprises blocks which are arranged in rows (41, 42, 43) along a longitudinal direction XX' and are delimited transversely by longitudinal cuts (51, 52). FIG. 3 shows a sectional view through the two lateral rows 41, the two intermediate rows 42 and the median row 43. Each intermediate row 42 is separated from the neighbouring lateral row 41 by an outer longitudinal cut 51 positioned at a mean distance D1 in relation to the median plane XZ, and from the median row 43 by an inner longitudinal cut 52 positioned at a mean distance D3 in relation to the median plane XZ. Each outer longitudinal cut 51 is a sipe having a depth PI at least equal to 50% of the height H of the tread and a width WI strictly less than 20% of the said depth PI. Each inner longitudinal cut 52 is a groove having a depth PR at least equal to 50% of the height H of the tread and a width WR at least equal to 20% of the said depth PI. The height H of the tread is equal to the maximum cut depth measured along a direction perpendicular to the tread surface 2: it is therefore the distance between the tread surface 2 and an imaginary surface 23 which is parallel to the tread surface 2 and tangential to the bottom of the cut having the maximum depth. The tread has a width L, measured along a transverse direction YY' between two lateral edges 21 of the tread surface 2. A single lateral edge 21 is shown in FIG. 3, in the knowledge that the symmetrical part of the tread, in relation to the median plane XZ, is shown at the level of a meridian section through a transverse cut 61 of a lateral row 41. FIG. 3 also presents, in meridian section, a ventilation cavity 7 which opens into the tread surface 2 and has a depth PC at least equal to 70% of the height H—equal to 100% of the height H, in the case shown—, the said ventilation cavity 7 being positioned along the longitudinal direction XX' between two consecutive transverse grooves (not shown in FIG. 3) in one and the same lateral row 41. Also shown is a ventilation cavity 8, which opens into a lateral face 22 of the tread but not into the tread surface 2 when the tire is new and is positioned along the longitudinal direction XX' between two surfaces (not shown in FIG. 3) into which consecutive transverse grooves 61 in one and the same lateral row 41 open.

Figure 4:
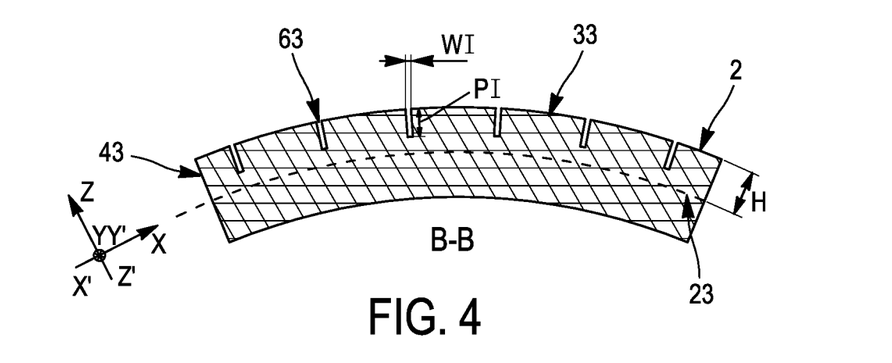
FIG. 4: Circumferential section through the median row of the tread according to the invention, through the median circumferential section plane B-B.

FIG. 4 is a circumferential section through the median row 43 of the tread according to the invention, through the median circumferential section plane B-B. The median row 43 comprises blocks 33 which are separated in pairs by transverse cuts 63. Each transverse cut 63 is a sipe having a depth PI at least equal to 50% of the height H of the tread and a width WI strictly less than 20% of the said depth PI. The height H of the tread is equal to the maximum cut depth measured along a direction perpendicular to the tread surface 2: it is therefore the distance between the tread surface 2 and an imaginary surface 23 which is parallel to the tread surface 2 and tangential to the bottom of the cut having the maximum depth.

Figure 5:
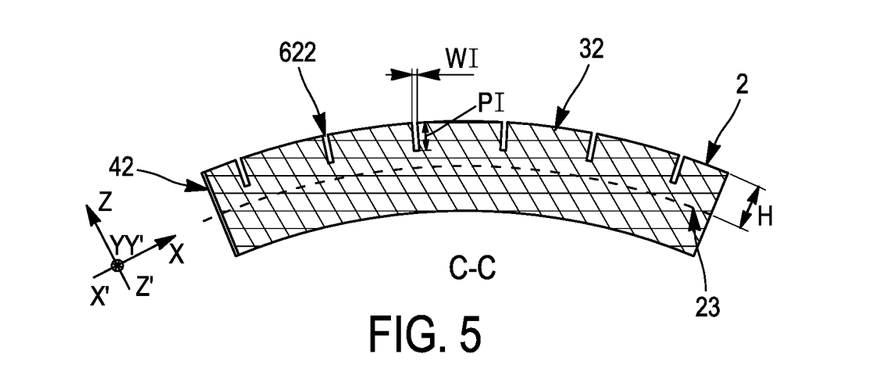
FIG. 5: Circumferential section through an intermediate row of the tread according to the invention, through a circumferential section plane C-C, outside the blind transverse grooves.

FIG. 5 is a circumferential section through an intermediate row 42 of the tread according to the invention, through a circumferential section plane C-C, outside the blind transverse grooves. The blocks 32 in the intermediate row 42 are separated in pairs, in their transversely inner portion, by transverse sipes 622, having a depth PI at least equal to 50% of the height H of the tread, measured between the tread surface 2 and the imaginary surface 23 that is parallel to the tread surface 2 and tangential to the bottom of the cut having the maximum depth, and a width WI strictly less than 20% of the said depth PI.

Figure 6:
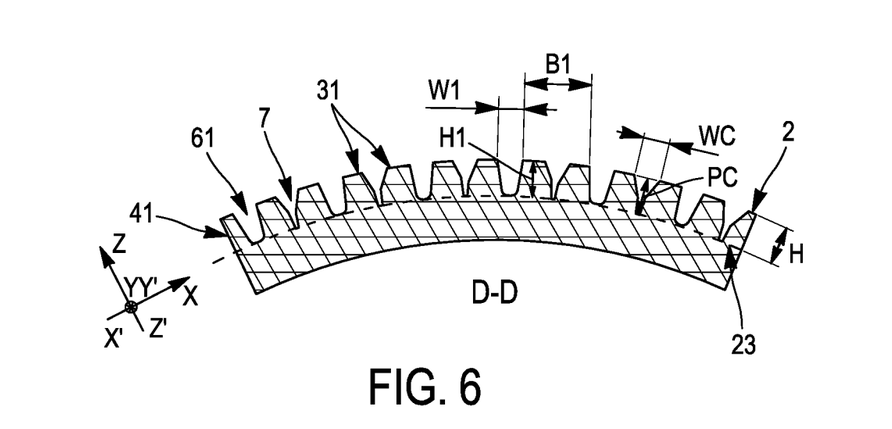
FIG. 6: Circumferential section through a lateral row of the tread according to the invention, through a circumferential section plane D-D.

FIG. 6 is a circumferential section through a lateral row 41 of the tread according to the invention, through a circumferential section plane E-E. The lateral row 41 comprises blocks 31 which are separated in pairs by transverse cuts 61. Each transverse cut 61 is a groove having a depth PR at least equal to 50% of the height H of the tread, measured between the tread surface 2 and the imaginary surface 23 that is parallel to the tread surface 2 and tangential to the bottom of the cut having the maximum depth, and a width WR at least equal to 20% of the said depth PR. Each block 31 in a lateral row 41, delimited by two consecutive transverse grooves 61, has a block height H1 along a direction perpendicular to the tread surface and a block length B1 along the longitudinal direction XX'. Advantageously, the block height H1 is at most equal to 80% of the block length B1. Each transverse groove 61, delimited by two blocks 31, has a transverse groove width W1 along the longitudinal direction XX'. Advantageously, the transverse groove width W1 is at least equal to 18% and at most equal to 35% of the sum of the transverse groove width W1 and the block length B1. FIG. 6 also shows ventilation cavities 7 which open into the tread surface 2 and have a depth PC at least equal to 70% of the height H—equal to 100% of the height H, in the case shown—, the said ventilation cavities being positioned along the longitudinal direction XX' between two consecutive transverse grooves 61 in one and the same lateral row 41.

The inventors more particularly studied this invention for a tire of size 59/80 R 63 that is intended to be mounted on a dumper and to carry a load equal to 100 000 kg when it is inflated to a pressure equal to 7 bar, in accordance with the TRA standard (TRA Year Book 2019).

The inventors compared, in the tire size 59/80 R 63, a tire I comprising a tread according to the invention with a reference tire R of size 59/80 R 63 of the Michelin XDR3 range.

Table 1 below shows the respective characteristics of a tread according to the invention and a reference tread:

TABLE 1

| Characteristics of the tread | Tire I | Tire R | Comments |
|---|---|---|---|
| Width L of the tread | 1235 mm | 1233 mm | |
| Height H of the tread (maximum depth of a cut) | 100 mm | 110 mm | |
| Depth PR of transverse/longitudinal groove | 100 mm | 110 mm | |
| Width WR of transverse/longitudinal groove | 75 mm | 55 mm | |
| Depth PI of transverse/longitudinal sipe | 80 mm | NA (not applicable) | |
| Width WI of transverse/longitudinal groove | 15 mm | NA | |

TABLE 1-continued

| Characteristics of the tread | Tire I | Tire R | Comments |
|---|---|---|---|
| Distance D1 of an outer longitudinal cut (in relation to the median plane XZ) | 350 mm | 310 mm | I: D1 = 28% L<br>R: D1 = 25% L |
| Distance D2 of a transversely inner end of a blind transverse groove in an intermediate row (in relation to the median plane XZ) | 315 mm | 290 mm | I: D2 = 26% L<br>R: D2 = 24% L |
| Distance D3 of an inner longitudinal cut (in relation to the median plane XZ) | 116 mm | NA | I: D3 = 9% |
| Height H1 of a block 31 in lateral row 41 | 100 mm | 110 mm | |
| Length B1 of a block 31 in lateral row 41 | 208 mm | 194 mm | I: H1/B1 = 48%<br>R: H1/B1 = 57% |
| Width W1 of a transverse groove 61 between two blocks 31 in lateral row 41 | 75 mm | 55 mm | I: W1/(W1 + B1) = 27%<br>R: W1/(W1 + B1) = 22% |
| Width WC of a ventilation cavity 7 in lateral row 41 | 72 mm | 51 mm | |
| Depth PC of a ventilation cavity 7 in lateral row 41 | 100 mm | 42 mm | I: PC/H = 100%<br>R: PC/H = 38% |

A tire I comprising a tread according to the invention and a reference tire R have been compared by tests carried out on construction plant vehicles, with respect to grip on wet ground, and by digital simulations using the finite element method, to establish a map of the temperatures reached in the crown of the tire. As regards grip on wet ground, the braking distance for the tire according to the invention, on a clay surface which has been damped down, is approximately 11% less than that of the reference tire, mainly owing to the greater width and length of the lateral transverse cuts. As regards the temperature levels reached in the crown of the tire, digital simulations showed a potential reduction of 3° C. between the lateral rows of the respective treads of the tire according to the invention and the reference tire, and a potential reduction of 2° C. between the median portions of the respective treads of the tire according to the invention and the reference tire.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread of a tire for a heavy-duty vehicle that is intended to come into contact with the ground via a tread surface, comprising blocks which are arranged in rows along a longitudinal direction (XX') and are delimited by cuts,
the tread having a width (L), measured along a transverse direction (YY') between two lateral edges of the tread surface, and a height (H), which is equal to the maximum depth of a cut measured along a direction perpendicular to the tread surface,
wherein the cuts are;
inner longitudinal grooves having a depth (PR) at least equal to 50% of the height (H) of the tread and a width (WR) at least equal to 20% of the said depth (PR), and
outer longitudinal sipes having a depth (PI) at least equal to 50% of the height (H) of the tread and a width (WI) strictly less than 20% of the said depth (PI),
the tread comprising five rows which are separated in pairs by the inner longitudinal grooves and outer longitudinal sipes and are distributed, along the transverse direction (YY'), in a median row, centred on a median plane (XZ) perpendicular to the tread surface at its middle, two intermediate rows, which are on either side of the median row and are symmetrical in relation to the median plane (XZ), and two lateral rows, which are transversely outermost and symmetrical in relation to the median plane (XZ),
the blocks in each respective row being separated in pairs at least partially by a transverse cut,
wherein each transverse cut in a lateral row is a transverse groove extending from a lateral edge of the tread surface to a respective outer longitudinal sipe,
wherein each transverse cut in an intermediate row is either:
a blind transverse groove, which continues a transverse groove in the neighbouring lateral row and extends from the respective outer longitudinal sipe to a transversely inner end (E2) of the blind transverse groove, or
a transverse sipe extending from the respective outer longitudinal sipe to a respective inner longitudinal groove,
wherein every blind transverse groove alternates with a transverse sipe, along the longitudinal direction (XX'), and
wherein each inner longitudinal cut separating two adjacent rows, respectively intermediate and median, is a are the inner longitudinal grooves.

2. The tread according to claim 1, wherein each outer longitudinal sipe has a mean line (M1) positioned, in relation to the median plane (XZ) of the tread and along the transverse direction (YY'), at a mean distance (D1) at least equal to 20% of the width (L) of the tread.

3. The tread according to claim 1, wherein each outer longitudinal sipe has a mean line (M1) positioned, in relation to the median plane (XZ) of the tread and along the transverse direction (YY'), at a mean distance (D1) at most equal to 35% of the width (L) of the tread.

4. The tread according to claim 1, wherein each transversely inner end (E2) of a blind transverse groove in an intermediate row is positioned, in relation to the median plane (XZ) of the tread and along the transverse direction (YY'), at a distance (D2) at least equal to 20% of the width (L) of the tread.

5. The tread according to claim 1, wherein each transversely inner end (E2) of a blind transverse groove in an intermediate row is positioned, in relation to the median plane (XZ) of the tread and along the transverse direction (YY'), at a distance (D2) at most equal to 35% of the width (L) of the tread.

6. The tread according to claim 1, wherein each inner longitudinal cut has a mean line (M3) positioned, in relation to the median plane (XZ) of the tread and along the transverse direction (YY'), at a mean distance (D3) at least equal to 5% of the width (L) of the tread.

7. The tread according to claim 1, wherein each inner longitudinal groove has a mean line (M3) positioned, in relation to the median plane (XZ) of the tread and along the transverse direction (YY'), at a mean distance (D3) at most equal to 20% of the width (L) of the tread.

8. The tread according to claim 1, wherein each transverse cut in the median row is a transverse sipe which continues a transverse sipe in the neighbouring intermediate row and extends from a first inner longitudinal cut to a second inner longitudinal cut.

9. The tread according to claim 1, wherein each block in a lateral row that are delimited by two consecutive transverse grooves, having a block height (H1) along a direction perpendicular to the tread surface (ZZ') and a block length (B1) along the longitudinal direction (XX'), wherein the block height (H1) is at most equal to 80% of the block length (B1).

10. The tread according to claim 1, with each block in a lateral row having a block length (B1) along the longitudinal direction (XX'), and each transverse groove, delimited by two blocks, having a transverse groove width (W1) along the longitudinal direction (XX'), wherein the transverse groove width (W1) is at least equal to 18% of the sum of the transverse groove width (W1) and the block length (B1).

11. The tread according to claim 1, with each block in a lateral row having a block length (B1) along the longitudinal direction (XX'), and each transverse groove, delimited by two blocks, having a transverse groove width (W1) along the longitudinal direction (XX'), wherein the transverse groove width (W1) is at most equal to 35% of the sum of the transverse groove width (W1) and the block length (B1).

12. The tread according to claim 1, wherein at least one ventilation cavity, opening into the tread surface and having a depth (PC) at least equal to 70% of the height (H), is positioned, along the longitudinal direction (XX'), between at least two consecutive transverse grooves in one and the same lateral row.

13. The tread according to claim 1, with the tread comprising two outer lateral faces, each intersecting the tread surface at a lateral edge of the tread surface, all transverse grooves in a lateral row opening into a lateral face of the tread along an open section, wherein at least one ventilation cavity, opening into a lateral face of the tread but not onto the tread surface when the tire is new, is positioned, along the longitudinal direction (XX'), between at least two surfaces into which consecutive transverse grooves in one and the same lateral row open.

14. A tire for a heavy-duty vehicle, that comprises a tread according to claim 1.

* * * * *